United States Patent [19]

Finter et al.

[11] Patent Number: 6,001,428
[45] Date of Patent: *Dec. 14, 1999

[54] SOLID EPOXY RESIN COMPOSITIONS CROSSLINKABLE WITH UV RAYS

[75] Inventors: Jürgen Finter, Freiburg, Germany; Philippe-Guilhaume Gottis, Mulhouse, France; Alfred Möckli, Basle, Switzerland

[73] Assignee: Ciba Specialty Chemicals Corp., Tarrytown, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/630,738

[22] Filed: Apr. 10, 1996

Related U.S. Application Data

[63] Continuation of application No. 08/384,189, Feb. 6, 1995, abandoned.

[51] Int. Cl.$^6$ ........................................................ B05D 7/24
[52] U.S. Cl. ........................ 427/485; 522/31; 522/66; 522/107; 525/505; 525/523
[58] Field of Search ........................ 525/438, 505, 525/523, 934; 522/31, 66, 170; 427/485

[56] References Cited

U.S. PATENT DOCUMENTS

| | | | |
|---|---|---|---|
| 4,256,828 | 3/1981 | Smith | 430/280 |
| 4,593,051 | 6/1986 | Koleske | 522/31 |
| 4,629,779 | 12/1986 | Koleske | 528/361 |
| 4,892,894 | 1/1990 | Koleske | 528/361 |
| 5,043,221 | 8/1991 | Koleske | 428/413 |
| 5,082,686 | 1/1992 | Desorie et al. | 427/54.1 |
| 5,312,879 | 5/1994 | Ras et al. | 525/526 |

FOREIGN PATENT DOCUMENTS

| | | |
|---|---|---|
| 0286594 | 10/1988 | European Pat. Off. . |
| 0540466 | 5/1993 | European Pat. Off. . |
| 0620259 | 10/1994 | European Pat. Off. . |
| 3-139515 | 6/1991 | Japan . |

OTHER PUBLICATIONS

Derwent Abstract 88–158440.
Research Disclosure, Bd. 322, No. 32288, Feb. 91.
Derwent Publication Abstr. 93–145790/18.
Derwent Abstract 88–287732/41.
Technical Paper FC85–417.
Derwent Abstract 88–158440, Apr. 30, 1988.
Research Disclosure, Bd. 322, Nr. 32288, Feb. 91.
Radtech Europe Conference, May 2 to 6, 1993, pp. 533–544.
Journal of Radiation Curing/Radiation Curing, Spring 1991, pp. 29–35.
Journal of Radiation Curing, Oct. 1986, pp. 3–9.
Technical Paper FC85–417.

*Primary Examiner*—Robert Dawson
*Assistant Examiner*—D. Aylward
*Attorney, Agent, or Firm*—David R. Crichton; Michele A. Kovaleski

[57] ABSTRACT

1. A solid composition comprising
(a) a solid oligomeric, cationically polymerisable polyglycidyl ether or polyglycidyl ester, a mixture of a solid oligomeric, cationically polymerisable polyglycidyl ether or polyglycidyl ester and a liquid or crystalline monomeric mono-, di- or polyepoxy resin, or a mixture of a solid oligomeric, cationically polymerisable polyglycidyl ether or polyglycidyl ester and a cyclic acetal, said oligomeric polyglycidyl ether or polyglycidyl ester and the mixtures containing the oligomeric polyglycidyl ether or polyglycidyl ester having a glass transition temperature ($T_G$) higher than 35° C.,
(b) a multifunctional nucleophilic chain transfer agent,
(c) 0.05 to 3% by weight, based on component (a), of a photoinitiator for the cationic polymerisation and, as optional components,
(d) customary additives for powder coating compositions, which compositions are free from compounds containing a primary, secondary or tertiary nitrogen atom or contain such compounds only in an amount which at most is 50% of the amount of component (c), based on the molar concentration.

7 Claims, No Drawings

SOLID EPOXY RESIN COMPOSITIONS CROSSLINKABLE WITH UV RAYS

This application is a continuation of application Ser. No. 08/384,189, filed Feb. 6, 1995, now abandoned.

The present invention relates to solid compositions, crosslinkable with UV rays, based on solid oligomeric, cationically polymerisable polyglycidyl ethers or polyglycidyl esters, multifunctional nucleophilic chain transfer agents and photoinitiators for the cationic polymerisation. The novel epoxy resin compositions are preferably used as powder coating compositions.

The curing of powder coating compositions based on epoxy resins comprising a photoinitiator by means of cationic polymerisation initiated by irradiation has been described by M. Wittig et al. at the RADTECH Europe Conference, May 2–6, 1993, Conference Proceedings, pages 533–544. This cure has the advantage that solid epoxy resins may be used which fuse at the desired temperature. However, in comparison with the polymerisation initiated by free radicals, longer cure times are required for the cationic polymerisation initiated by irradiation, and because of the low photosensitivity high concentrations of the initiator must be used. Also, the mechanical properties of the cured coatings are unsatisfactory.

The Journal of Radiation Curing/Radiation Curing, Spring 1991, pages 29–35 reports on the use of Lewis bases such as pyridine, N-vinylpyrrolidone or N,N-dimethylaniline as additives to photoinitiators and of polyols as chain transfer agents in the UV radiation-initiated cationic polymerisation of liquid epoxy resins, and it is mentioned that the use of Lewis bases results in a retardation of the reaction time which may be advantageous for use in the adhesives field.

Likewise, the Journal of Radiation Curing, October 1986, pages 3–9, describes only the use of liquid cycloaliphatic or low viscosity aromatic epoxy resins to investigate the influence of polyols as chain transfer agents in the UV radiation-initiated cationic polymerisation of epoxy resins.

Technical Paper FC85-417 of the Radcure Europe 85 Conference, May 6–8, 1985, describes the cationic photopolymerisation of the diglycidyl ethers of different molecular weight, obtained by the advancement reaction of the diglycidyl ether of bisphenol A with bisphenol A, using iron arene salts as cationic photoinitiators, and it is reported that the molecular weight of the diglycidyl ether has no influence on the degree of reaction during photopolymerisation and that the higher the molecular weight of the diglycicyl ethers the lower the glass transition temperatures of the photopolymerised diglycidyl ethers. It may therefore be deduced that the secondary hydroxyl groups of the advanced diglycidyl ethers do not participate in the cationic photopolymerisation.

There is a need for powder coating compositions having good flow at temperatures below 130° C., good reactivity and at the same time high storage stability. It is not possible to achieve these properties heat-crosslinking with epoxy resin powder coating compositions, as crosslinking reactions taking place at a lower temperature require larger amounts of hardeners, lowering the glass transition temperature ($T_G$) of the curable epoxy resin composition to such a degree that the storage stability is diminished.

Surprisingly, it has now been found that solid epoxy resins having a $T_G$ higher than 35° C. can be polymerised to substantially higher degree of polymerisation by means of UV radiation, using cationic photoinitiators such as sulfonium salts in the presence of small amounts of chain transfer agents containing no nitrogen atom in the molecule. Furthermore, it has been found that the products so obtained have high $T_G$ values and that such solid epoxy resin compositions may expediently be used as powder coating compositions.

Accordingly, the present invention relates to solid compositions comprising
(a) a solid oligomeric, cationically polymerisable polyglycidyl ether or polyglycidyl ester, a mixture consisting of a solid oligomeric, cationically polymerisable polyglycidyl ether or polyglycidyl ester and a liquid or crystalline monomeric mono-, di- or polyepoxy resin, or a mixture consisting of a solid oligomeric, cationically polymerisable polyglycidyl ether or polyglycidyl ester and a cyclic acetal, said oligomeric polyglycidyl ether or polyglycidyl ester and the mixtures containing the oligomeric polyglycidyl ether or polyglycidyl ester having a glass transition temperature ($T_G$) higher than 35° C.,
(b) a multifunctional nucleophilic chain transfer agent,
(c) 0.05 to 3% by weight, based on component (a), of a photoinitiator for the cationic polymerisation and, as optional components,
(d) customary additives for powder coating compositions, which compositions are free from compounds containing a primary, secondary or tertiary nitrogen atom or contain such compounds only in an amount which at most is 50% of the amount of component (c), based on the molar concentration.

The novel compositions are preferably free from compounds containing a primary, secondary or tertiary nitrogen atom in the molecule.

Solid oligomeric polyglycidyl ethers used as mixture component (a) may conveniently be the diglycidyl ethers obtained by the reaction of dihydric phenols, such as bisphenols, with epichlorohydrin in the so-called Taffy process, or the advanced diglycidyl ethers obtained by the advancement reaction of diglycidyl ethers of dihydric phenols, such as bisphenol diglycidyl ethers, with an advancement agent, typically a divalent phenol such as bisphenol A.

Glycidyl ethers which may be converted into oligomeric glycidyl compounds by the advancement process are typically the glycidyl ethers of mononuclear phenols such as resorcinol or hydroquinone, or those of polynuclear phenols, such as bis(4-hydroxyphenyl)methane, 4,4'-dihydroxybiphenyl, bis(4-hydroxyphenyl)sulfone, 2,2-bis(4-hydroxyphenyl)propane or 2,2-bis(3,5-dibromo-4-hydroxyphenyl)propane.

Solid oligomeric polyglycidyl ethers suitable for the novel compositions are also the epoxy novolaks which are obtainable by the known reaction of novolaks with epichlorohydrin or β-methylepichlorohydrin under alkaline conditions, or in the presence of an acid catalyst and subsequent treatment with alkali. It is common knowledge that novolaks are condensation products of aldehydes such as formaldehyde, acetaldehyde, chloral or furfuraldehyde, and phenols, such as phenol or phenols substituted in the nucleus by chlorine atoms or $C_1$-$C_9$alkyl groups, typically 4-chlorophenol, 2-methylphenol or 4-tert-butylphenol.

Solid oligomeric polyglycidyl esters suitable for the novel compositions are the oligomeric polyglycidyl esters likewise obtained by the Taffy process or advancement process from monomeric polyglycidyl esters. It is convenient to use glycidyl esters of aliphatic polycarboxylic acids, such as succinic acid, adipic acid or sebacic acid, or of cycloaliphatic polycarboxylic acids, such as hexahydroterephthalic acid, hexahydroisophthalic acid or 4-methylhexahydrophthalic acid, or of aromatic polycarboxylic acids, such as phthalic acid, isophthalic acid or terephthalic acid.

Liquid or crystalline monomeric mono-, di- or polyepoxy resins which may be used in admixture with the solid oligomeric polyglycidyl ethers or polyglycidyl esters as component (a) are typically polyglycidyl esters and poly(β-methylglycidyl)esters, obtainable by reaction of a compound containing at least one carboxyl group in the molecule, e.g. terephthalic acid or hexahydrophthalic acid, and epichlorohydrin or β-methylepichlorohydrin; polyglycidyl ethers or poly(β-methylglycidyl)ethers obtainable by reaction of a compound containing at least one free alcoholic hydroxyl group and/or phenolic hydroxyl group with epichlorohydrin or β-methylepichlorohydrin under alkaline conditions, or in the presence of an acid catalyst and subsequent treatment with alkali; and cycloaliphatic epoxy resins such as bis(2,3-epoxycyclopentyl)ether, 2,3-epoxy-cyclopentylglycidyl ether, 1,2-bis(2,3-epoxycyclopentyloxy)ethane or 3,4-epoxycyclohexylmethyl-3',4'-epoxycyclohexanecarboxylate.

The novel epoxy resin compositions preferably comprise as mixture component (a) solid oligomeric polyglycidyl ethers or polyglycidyl esters or solid epoxy-phenol novolaks or epoxy-cresol novolaks.

The novel epoxy resin compositions in particular comprise solid oligomeric polyglycidyl ethers.

In a preferred embodiment of the novel compositions the mixture component (a) has a $T_G$ value of at least 40° C.

As multifunctional nucleophilic chain transfer agents (b) the novel epoxy resin compositions may comprise e.g. polyvalent carboxylic acids, aldehydes, phenols or primary aliphatic alcohols. The chain transfer agents may be dissolved in a reactive diluent such as 4-butyrolactone, 1,2-propylenecarbonate or a cyclic acetal, e.g. dioxolane.

Suitable polyvalent carboxylic acids are typically aliphatic polycarboxylic acids, such as succinic acid, glutaric acid, adipic acid, pimelic acid, suberic acid, azelaic acid or dimerised or trimerised linoleic acid; aliphatic hydroxycarboxylic acids such as tartaric acid, lactic acid or citric acid; cycloaliphatic polycarboxylic acids such as tetrahydrophthalic acid, 4-methyltetrahydrophthalic acid, hexahydrophthalic acid, hexahydroterephthalic acid, hexahydroisophthalic acid or 4-methylhexahydrophthalic acid; or aromatic polycarboxylic acids such as phthalic acid, isophthalic acid or terephthalic acid, trimellitic acid or benzophenonetetracarboxylic acid.

Aldehydes suitable as multifunctional nucleophilic chain transfer agent (b) are typically aliphatic, araliphatic or aromatic aldehydes such as malondialdehyde, succinaldehyde, glutaraldehyde, isophthaldialdehyde, terephthaldialdehyde or salicylaldehyde.

Phenols suitable as multifunctional nucleophilic chain transfer agents (b) are typically polyhydric as well as mononuclear or polynuclear phenols, such as resorcinol, hydroquinone, bis(4-hydroxyphenyl)methane, 4,4'-dihydroxybiphenyl, bis(4-hydroxyphenyl)sulfone, 2,2-bis(4-hydroxyphenyl)propane or 2,2-bis(3,5-dibromo-4-hydroxyphenyl)propane.

Primary aliphatic alcohols suitable as multifunctional nucleophilic chain transfer agent (b) are all compounds containing at least one, preferably at least two, primary aliphatic hydroxyl groups in the molecule, typically ethylene glycol, polyethylene glycols having a degree of polymerisation of 2 to <1000, polyethylene oxide-polypropylene oxide-polyethylene oxide block copolymer, neopentyl glycol, 2-ethyl-2'-propyl-1,3-propanediol, hydroxypivalylhydroxypivalate, 1,4-butanediol, 1,6-hexanediol, 3(4),8(9)-bis(hydroxymethyl)-tricyclo[5.2.1.0$^{2,6}$]decane, 1,1,1-trihydroxymethylpropane, bis(2-hydroxyethyl-hydroquinone)ether, hydroxyl-terminated polyesters having a hydroxyl number lower than 110 mg KOH/g, β-hydroxy ethers, the secondary hydroxyl groups of which are grafted with ε-caprolactone, or reaction products of a polyvalent alcohol with ε-caprolactone.

The multifunctional nucleophilic chain transfer agents are normally used in such amounts that there is up to 1 equivalent of the functional groups of the chain transfer agent per 1 equivalent glycidyl group. Preferably, the ratio of the functional group of the chain transfer agent, e.g. a hydroxyl group, to the glycidyl group is from 0.05 to 0.8.

As multifunctional nucleophilic chain transfer agent (b) the novel mixtures preferably comprise primary aliphatic polyols.

Photoinitiators for the cationic polymerisation, e.g. onium salts, used as component (c) in the novel compositions are disclosed, inter alia, in EP-0 297 442 and EP-0 580 552.

The novel compositions usually contain the photoinitiators for the cationic polymerisation in amounts of 0.05 to 3% by weight, based on the epoxy resin component (a).

If required, the novel compositions may additionally contain sensitisers such as anthracene, anthracene derivatives, perylene or other polynuclear aromatic compounds.

The novel epoxy resin compositions preferably contain sulfonium salts as cationic photoinitiators, in particular a sulfonium salt of formula I

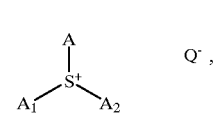

wherein A, $A_1$ and $A_2$ are identical or different aliphatic, cycloaliphatic or aromatic radicals which may unsubstituted or mono- or polysubstituted and which may contain heteroatoms, and wherein two of the radicals A, $A_1$ and $A_2$ may be linked to form a ring or a ring structure, and $Q^-$ is a complex anion such as $BF_4^-$, $FeCl_4^-$, $PF_6^-$, $SbF_6^-$, $AsF_6^-$, $SnCl_6^-$, $SbCl_6^-$, $BiCl_5^-$ or $SbF_5OH^-$.

In formula I, A, $A_1$ and $A_2$ may typically each be unsubstituted or halogen-substituted $C_1$–$C_{12}$alkyl such as methyl, ethyl, n-propyl, tert-butyl or 4-chlorobutyl, a cycloaliphatic radical, such as cyclohexyl or cyclopentyl, which may unsubstituted or substituted by alkyl, alkoxy or by halogen atoms, an unsubstituted aromatic radical or an aromatic radical substituted by alkyl, alkoxy, phenylthio or by halogen atoms, e.g. phenyl, naphthyl, methylphenyl, methoxyphenyl, chlorophenyl, bromophenyl, dichlorophenyl, dimethylphenyl, or two of the radicals A, $A_1$ and $A_2$ may be linked to form a ring, such as tetramethylene or pentamethylene, or a ring structure, such as

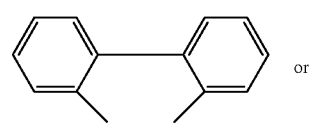 or

-continued

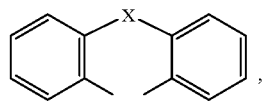

wherein X is —O—, —CH$_2$—, —NH—, —CO—, —CH$_2$—CH$_2$— or —S—.

Very particularly preferred photoinitiators for this invention are the aromatic sulfonium salts, in particular an unsubstituted triarylsulfonium hexafluorophosphate or triarylsulfonium hexafluoroantimonate or a triarylsulfonium hexafluorophosphate or triarylsulfonium hexafluoroantimonate substituted by phenylthio groups.

Besides the photoinitiators mentioned above, customary cationic photoinitiators are also suitable, such as aryliodonium salts with non-nucleophilic counterions, e.g. BF$_4^-$, PF$_6^-$, SbF$_6^-$, or or the systems disclosed in EP-A-562 897. A survey of possible photoinitiators suitable for cationic polymerisation of epoxy resins is provided by R. S. Davidson in the Journal of Photochem. Photobiol. A; Chem, 73 (1993), pages 81 to 96.

Customary additives for powder coating compositions (d) which may be present in the novel compositions are conveniently dyes, pigments, such as preferably TiO$_2$, deaerating agents, preferably benzoin, flow control agents such as polyvinylacetals, e.g. polyvinylbutyral (Movital®B 30, sold by HOECHST), polyethylene glycol, glycerol, acryl copolymers such as Modaflow® or Acrylon®MFP, sold by MONSANTO and PROTEX, antipitting agents or fillers, in particular mineral fillers such as quartz powder or natural barium sulfate).

Compounds containing a primary, secondary or tertiary nitrogen atom in the molecule may typically be a catalytic hardener or a catalyst which is added to the novel composition, or impurities in the components (a), (b) or (d), preferably catalyst radicals in the compounds of component (a), in particular in those oligomeric polyglycidyl ethers or polyglycidyl esters which are advancement resins. The novel compositions may only contain such impurities or catalyst radicals, e.g. tertiary amines, typically imidazoles such as 2-methylimidazole, N-benzyldimethylamine or 2,4,6-tris(dimethylaminoethyl)phenol, in such amounts that their molar concentrations are at most 50% of the molar concentration of the photoinitiator (c) in the novel compositions.

The preparation of the powder composition may be carried out by mixing the components of the mixture in the melt, preferably in an injection moulding machine, such as a Buss KO-kneader, in the temperature range from 70° C. to 200° C. and comminuting the cooled melt, or by homogenising the components of the mixture under high shear forces in the temperature range below 120° C., for example in a ball mill.

The novel epoxy resin compositions are mixtures which are storage-stable when unexposed to light and their crosslinking reaction is only initiated by light. Prior to their photoinduced cationic polymersiation, the novel epoxy resin compositions may be fused at elevated temperature, at c. 90–180° C., without losing their latency.

As mentioned at the outset, the novel epoxy resin compositions are preferably used as powder coating compositions. They may be conveniently milled mechanically to a particle size smaller than 100 μm and electrostatically deposited, after Tribo- or Corona charging, onto that part of a homogeneous layer which is to be coated. The powder layer is then fused by warming either in a circulating air oven or by radiation heat such as short-wave or medium-wave infrared radiation.

The crosslinking reaction is effected by exposing the fused layer to actinic radiation. For irradiation any kind of light source may be used which emits an intense enough radiation in the wave-length range of 300–400 nm, for example xenon lamps, metal halide lamps, UV argon laser, double-frequency helium neon laser lamps and, in particular, mercury vapour high pressure lamps, mercury xenon lamps and mercury medium pressure lamps. Electron beam radiation may also be used for the crosslinking reaction.

Preferably, the fused layer is irradiated in the melted state at elevated temperature. However, it is also possible to allow the fused layer to vitrify by cooling, to crosslink the vitrified layer by exposure to light and to allow it to react completely by thermal aftertreatment in the temperature range of typically above 90° C.

Irradiation can also be carried out imagewise through a mask. If the unexposed and unreacted parts of the image are removed, for example, by development with a solvent, then a relief image is obtained which may conveniently be used as photoresist.

The novel epoxy resin compositions are also suitable for coating heat-sensitive substrates such as plastics, wood or paper, or also for the preparation of three-dimensional mouldings, by irradiating the novel epoxy resin compositions with a scanning laser in a fluidised bed. Furthermore, the novel epoxy resin compositions may also be used as powder in dry screen printing. The dry screen printing process as well as the apparatus for carrying it out are disclosed, inter alia, in PCT specification WO 92/03295 in more detail.

EXAMPLE 1

29.66 g of a solid diglycidyl ether of bisphenol A, advanced with bisphenol A and having an epoxy value of 1.3 equivalent/kg, are fused with stirring. 0.337 g of triethylene glycol is added to the melt at 160° C. and the mixture is stirred for 2 minutes. To this mixture are then added 0.3 g of the photoinitiator solution UV-I 6974® (mixture of a triarylsulfonium hexafluoroantimonate in propylenecarbonate, sold by Union Carbide). The melt is then chilled by pouring onto a steel plate, cooled to room temperature and then milled. The ratio of hydroxyl groups to glycidyl groups and the amount of the initiator in the powder so obtained are indicated in Table 1.

EXAMPLES 2–11

Example 1 is repeated, but using the epoxy resin and the triethylene glycol in different mixture ratios or using another polyol. The ratio of hydroxyl groups to glycidyl groups and the amount of the initiator in the powders so obtained are indicated in Table 1.

TABLE 1

Powder coatings consisting of an advanced diglycidyl ether of bisphenol A, a polyol and a photoinitiator

| Example | polyol type | epoxy resin [g] | polyol [g] | hydroxyl glycidyl [equivalent] | initiator [% by weight] |
|---|---|---|---|---|---|
| 1 | A | 29.66 | 0.34 | 0.10 | 1 |
| 2 | A | 27.22 | 2.78 | 0.50 | 1 |
| 3 | A | 28.75 | 1.26 | 0.30 | 0.25 |
| 4 | B | 27.57 | 2.50 | 0.40 | 1 |

TABLE 1-continued

Powder coatings consisting of an advanced diglycidyl ether of bisphenol A, a polyol and a photoinitiator

| Example | polyol type | epoxy resin [g] | polyol [g] | hydroxyl glycidyl [equivalent] | initiator [% by weight] |
|---|---|---|---|---|---|
| 5 | C | 27.71 | 2.39 | 0.20 | 1 |
| 6 | D | 28.28 | 1.71 | 0.50 | 0.5 |
| 7 | D | 28.86 | 1.18 | 0.40 | 0.5 |
| 8 | E | 27.525 | 2.48 | 0.50 | 0.5 |
| 9 | F | 19.88 | 10.22 | 0.40 | 1 |
| 10 | F | 17.08 | 13.00 | 0.50 | 1 |
| 11 | F | 49.89 | 9.43 | 0.20 | 0.5 |

A = triethylene glycol
B = bis(2-hydroxy ethyl hydroquinone) ether
C = CAPA 316 ® (reaction product of a polyvalent alcohol and ε-caprolacton, sold by Solvay)
D = 1,1,1-trihydroxymethylpropane
E = 2',2-methylpropyl-1,3-propanediol
F = hydroxyl-terminated polyester of terephthalic acid and neopentyl glycol (OH number = 100 mg KOH/g; MG = 3600, measured by GPC with polystyrene standards)

EXAMPLE 12

A master batch is prepared from 5 g of photoinitiator solution according to Example 1 and 95 g of a solid diglycidyl ether of bisphenol A, advanced with bisphenol A and having an epoxy value of 1.3 equivalent/kg, by mixing the components in the melt at 175° C. for 5 minutes and subsequently chilling the mixture by pouring it onto a steel sheet. 12 g of this master batch are milled in a ball mill with 37.49 g of a solid diglycidyl ether of bisphenol A, advanced with bisphenol A and having an epoxy equivalent weight of 735, and 9.43 g of a hydroxyl-terminated polyester having a hydroxyl number of 100 mg KOH/g, prepared from terephthalic acid and neopentyl glycol, and homogenised by extrusion in a melt mixer at 135° C.

EXAMPLE 13

28.64 g of a solid diglycidyl ether of bisphenol A, advanced with bisphenol A and having an epoxy equivalent weight of 735, and 0.55 g of 3,4-epoxycyclohexylmethyl-3',4'-epoxycylohexanecarboxylate are fused with stirring. 0.812 g of triethylene glycol is added to the melt at 160° C. and, after stirring for 2 min, 0.15 g of the photoinitiator solution UV-I 6974® is added. The melt is chilled, cooled to room temperature and milled.

EXAMPLE 14

Example 13 is repeated, but using the diglycidyl ether of bisphenol A (A), advanced with bispenol A, the 3,4-epoxycyclohexylmethyl-3',4'-epoxycylohexanecarboxylate (B), the triethylene glycol (TEG) and the photoinitiator in a different mixture ratio.

The mixture ratios of Examples 13 and 14 are shown in Table 2.

TABLE 2

Compositions of reactive powder coatings

| Example | A [% by weight] | B [% by weight] | TEG [% by weight] | photoinitiator [% by weight] |
|---|---|---|---|---|
| 13 | 95.00 | 1.81 | 2.61 | 0.50 |
| 14 | 92.49 | 3.98 | 2.86 | 0.56 |

EXAMPLES 15 and 16

In general accordance with the procedure of Example 13, a solid diglycidyl ether of bisphenol A (A), advanced with bisphenol A and having an epoxy equivalent weight of 735, and terephthalic acid diglycidyl ester (B) are fused with stirring. Neopentyl glycol (NPG) is added to the melt at 160° C. and, after stirring for 2 min, the photoinitiator solution UV-I 6974® is added. The melt is chilled, cooled to room temperature and milled. The mixing ratios are listed in Table 3.

TABLE 3

Compositions of reactive powder coatings

| Examples | A [% by weight] | B [% by weight] | NPG [% by weight] | photoinitiator [% by weight] |
|---|---|---|---|---|
| 15 | 85.05 | 9.45 | 4.27 | 0.99 |
| 16 | 80.19 | 8.91 | 8.94 | 0.99 |

EXAMPLE 17

In general accordance with Example 13, 600 g of a solid diglycidyl ether of bisphenol A, advanced with bisphenol A and having an epoxy equivalent weight of 585, and 200 g of an epoxy-cresol novolak, having an epoxy equivalent weight of 230, are fused with stirring. 2.93 g of neopentyl glycol are added to the melt at 160° C. and, after stirring for 2 min, 20 g of the photoinitiator solution UV-I 6974® and 0.4 g of 2-methylimidazole are added. The melt is chilled, cooled to room temperature and milled. 500 g of the powder so obtained are mixed with 125 g of barium sulfate (Blanc Fixe, sold by Solvay) and homogenised by extrusion at 90° C. in a twin-screw extruder (PRISM TSE 16).

EXAMPLES 18 and 19

600 g of a solid diglycidyl ether of bisphenol A, advanced with bisphenol A and having an epoxy equivalent weight of 585, are fused with stirring. 8.55 g of triethylene glycol are added to the melt at 160° C. and, after stirring for 2 min, 30 g of the photoinitiator solution UV-I 6974® and 30 g of 2-methylanthracene as sensitiser are added. The melt is chilled, cooled to room temperature and milled.

Example 19 is carried out in analogous manner. The mixture ratios are shown in Table 4.

TABLE 4

Powder coatings containing 2-methylanthracene as sensitiser

| Examples | eq OH-groups | photoinitiator [% by weight] | 2-methylanthracene [% by weight] |
|---|---|---|---|
| 18 | 10% | 0.5 | 0.5 |
| 19 | 20% | 0.25 | 0.15 |

EXAMPLES 20 and 21

300.0 g of a solid solution of 0.5% by weight of photoinitiator UV-I 6974® in diglycidyl ether of bisphenol A, advanced with bisphenol A and having an epoxy equivalent weight of 735, are pulverised. To this powder are added 9.31 g of a phenol-terminated adduct in powder form of bisphenol A and diglycidyl ether of bisphenol A, having a phenol group content of 228 g/eq, and mixed dry. This mixture is homogenised at 90° C. in a twin-screw extruder (PRISM TSE 16), chilled and milled.

Example 21 is carried out in analogous manner and the composition additionally contains 0.004% by weight of 2-methylimidazole. The mixture ratios are shown in Table 5.

TABLE 5

Powder coatings containing 2-methylimidazole as sensitiser

| Examples | eq OH-groups | photoinitiator [% by weight] | 2-methylimidazole [% by weight] |
|---|---|---|---|
| 20 | 10% | 0.5 | — |
| 21 | 20% | 1 | 0.004 |

EXAMPLES 22 to 23

In general accordance with the procedure of Example 20, powder coating compositions are prepared with 4-octyloxophenylphenyliodonium hexafluoroantimonate (OPHA), the preparation of which is disclosed in U.S. Pat. No. 4,992,571, and with arylsulfonium hexafluorophosphate, which is commercially available under the trade name KI-85 from Degussa, as photoinitiators. The solid epoxy resin has an epoxy equivalent weight of 685, and in each case triethylene glycol is used as chain transfer agent.

TABLE 6

Powder coating compositions containing different photoinitiators

| Example | eq OH-groups | photoinitiator type | photoinitiator [% by weight] |
|---|---|---|---|
| 22 | 10 | OPHA | 1 |
| 23 | 15 | KI-85 | 3 |
| 24 | 20 | UV-I 6974 ®/KI-85*⁾ | 1.5 |

*⁾Mixture ratio 1:1 parts by weight

APPLICATION EXAMPLES a) Photoreactivities

The reactivity of the powders obtained in Examples 1 to 11 can be determined by the photo-DSC method. The sample is heated to a predetermined temperature and then irradiated isothermically with UV light. The heat of reaction, caused by the onset of the crosslinking reaction, is an indicator for the completion of the reaction. At irradiation temperatures of <110° C. a thermal afterpolymerisation may be required.

The results are shown in Table 7.

TABLE 7

Reactivity of the powder coating compositions, measured by the photo-DSC method

| powder acc. to Example | enthalpy of reaction with isothermal exposure [KJ/equivalent glycidyl group] $T_{iso}$: | | | $T_G$*⁾ [° C.] |
|---|---|---|---|---|
| | 60° C. | 90° C. | 110° C. | |
| 1 | 69.4 | 99.5 | 125.1 | 111 |
| 2 | 92.3 | 100.7 | 118.7 | 65 |
| 3 | 63.8 | 81.6 | 84 | 86 |
| 4 | 82 | 96.4 | 114.4 | 81 |
| 5 | 59.5 | 102.2 | 82.3 | 86.3 |
| 6 | 60.9 | 103 | 102.8 | 98 |
| 7 | 58.5 | 103.2 | 118 | 99.8 |
| 8 | 61.6 | 98.7 | 105.4 | 73 |
| 9 | 72.5 | 108.1 | 117 | 97 |
| 10 | 53.7 | 98 | 106.7 | 88 |
| 11 | 19.5 | 78.7 | 86 | 107 |

*⁾$T_G$ value of the completely crosslinked powder coating composition, measured in the DSC at a heating rate of 20° C./min The reactivity of the powders prepared in Examples 13, 17 to 21 is determined by the photo-DSC method. The powder is heated to a predetermined temperature and then irradiated isothemically with UV light. The heat of reaction (enthalpy of reaction), caused by the beginning crosslinking reaction, is an indicator for the completion of the reaction.

The results are shown in Table 8.

TABLE 8

Enthalpy of reaction of some powder coating compositions

| powder acc. to Example | irradiation temperature [° C.] | enthalpy of reaction [kJ/eq epoxy] | $T_G$ [° C.] |
|---|---|---|---|
| 13 | 110 | 72 | 95 |
| 17 | 100 | 91 | >115 |
| 18 | 90 | 93 | 105 |
| 19 | 90 | 95 | 110 |
| 20 | 110 | 93 | 110 |
| 21 | 110 | 86 | 107 | b) Powder coatings

1.) Fusing and irradiation on a heating plate:

Solid mixtures are obtained by fusing or extruding are coarsely comminuted and then milled in a pin mill and sieved. A powder fraction having a granular size of <100 is sprayed electrostatically onto steel plates, fused in an IR flow oven (maximum surface temperature 140° C., flow time 60 sec) and then crosslinked in a UV flow irradiator (I=50 mW/cm², flow time 8 m/min). The extent of the photochemically induced crosslinking can be determined by exposure to light by means of a neutral wedge (21-step Resolution Guide, sold by Stauffer) and subsequent development with a solvent.

A powder coating composition according to Example 1 applied to steel plates gives a clear shiny coating of 65 μm thickness, reverse impact >20 cm/kg and hardness 2H. A clear hard coating is obtained on preheated (70° C.) MDFB plates (MDFB=medium density fibre board).

A powder fraction having a granular size of <100 μm is sprayed electrostatically onto aluminium plates. The following Table 9 shows the results for powder coated aluminium plates, obtained isothermically on a heating plate with a mercury lamp (Oriel Photoresist Illuminator) with 28.4 mWcm⁻² output in the UV-A (measured with Goldilux Photometer with UV-A sensor, sold by Oriel). The photosensitivity was determined by exposure to light by means of a neutral wedge (Stauffer 21-Step Resolution Guide). Impact tests were carried out with a Byk impact tester with a weight of 2 kg on plates fully hardened to step 7.

TABLE 9

Results of the impact test

| powder acc. to Example | temperature [° C.] | irradiation energy [mJcm$^{-2}$] | impact test [kg.cm] |
| --- | --- | --- | --- |
| 18 | 90 | 700 | 30 |
| 19 | 110 | 650 | 40 |
| 20 | 90 | 1950 | 10 |
| 20 | 110 | 1420 | 10 |
| 21 | 90 | 1950 | 10 |
| 21 | 110 | 1420 | 10 |

2.) Fusing in an IR flow oven, crosslinking with UV in a flow apparatus:

Powder-coated plates are fused in an IR flow oven with 2 medium-wave IR radiators (25·25 cm; 32 kW/m$^2$ and 19.2 kW/m$^2$ output at a distance of 15 cm) and crosslinked immediately afterwards in a UV laboratory flow irradiator (LC 6 with F-300 fusion lamp; power=80 mW/cm; manufactored by Fusion Systems) at 5 m/min band speed. The impact tests on the coated plates are carried out with a Byk impact tester with a weight of 2 kg. The results are shown in Table 10.

TABLE 10

Results of the impact test

| powder acc. to Example | band speed of the IR line [m/min] | number of UV passes | impact [kg.cm] |
| --- | --- | --- | --- |
| 17 | 1.5 | 2 | 30 |
| 18 | 2 | 1 | 30 |
| 19 | 1.5 | 1 | 40 |
| 20 | 1.8 | 2 | 35 |
| 21 | 1.5 | 3 | 25 |
| 22 | 2 | 3 | 30 |
| 23 | 1.5 | 2 | 20 |
| 24 | 2 | 2 | 25 |

What is claimed is:

1. A solid powder coating composition having a glass transition temperature (Tg) higher than 35° C. which becomes completely crosslinked upon exposure to ultraviolet (UV) light in the molten state comprising (a) a solid oligomeric, cationically polymerisable polyglycidyl ether or mixtures thereof, or a mixture of a solid oligomeric, cationically polymerisable polyglycidyl ether and a liquid or crystalline monomeric mono-, di- or polyepoxy resin, (b) as a multifunctional nucleophilic chain transfer agent, a primary aliphatic polyol whereby the ratio of hydroxyl groups of component (b) to the glycidyl groups of component (a) is in the range from 0.05 to 0.8, (c) 0.05 to 3% by weight, based on component (a), of a photoinitiator for the cationic polymerization and, as optional components, (d) customary additives for powder coating compositions, which compositions are free from compounds containing a primary, secondary or tertiary nitrogen atom or contain such compounds only in an amount that at most is 50% of the amount of component (c), based on the molar concentration.

2. A composition according to claim 1, which is free from compounds containing a primary, secondary or tertiary nitrogen atom in the molecule.

3. A composition according to claim 1, wherein component (c) is a sulfonium salt.

4. A composition according to claim 1, wherein component (c) is a triarylsulfonium salt.

5. A composition according to claim 1, wherein component (c) is a triarylsulfonium hexafluorophosphate or a triarylsulfonium hexafluoroantimonate.

6. A crosslinked coating which is obtained by electrostatically spraying a powder of a solid composition according to claim 1 onto a substrate, fusing the coating by applying heat, and subsequently effecting crosslinking by UV radiation and, if required, by heating.

7. A coating according to claim 6, wherein heating is effected by IR radiation.

* * * * *

UNITED STATES PATENT AND TRADEMARK OFFICE
CERTIFICATE OF CORRECTION

PATENT NO. : 6,001,428
DATED : DECEMBER 14, 1999
INVENTOR(S) : JÜRGEN FINTER ET AL.

It is certified that error appears in the above-identified patent and that said Letters Patent is hereby corrected as shown below:

On the title page, Section [30] should read:

-- Foreign Application Priority Data

[30]  Feb. 9, 1994    [CH]   Switzerland    00 388/94-0 --.

Signed and Sealed this

Seventh Day of November, 2000

Attest:

Q. TODD DICKINSON

*Attesting Officer*              *Director of Patents and Trademarks*